United States Patent
Hu

(10) Patent No.: US 8,976,424 B1
(45) Date of Patent: Mar. 10, 2015

(54) COMPUTING DEVICES USING EQUIPPED LIQUID CRYSTAL DISPLAY (LCD) FOR SCANNING

(71) Applicant: Darwin Hu, San Jose, CA (US)

(72) Inventor: Darwin Hu, San Jose, CA (US)

( * ) Notice: Subject to any disclaimer, the term of this patent is extended or adjusted under 35 U.S.C. 154(b) by 0 days.

(21) Appl. No.: 14/094,635

(22) Filed: Dec. 2, 2013

Related U.S. Application Data

(63) Continuation of application No. 13/214,184, filed on Aug. 20, 2011, now Pat. No. 8,610,970.

(51) Int. Cl.
  *H04N 1/04* (2006.01)
  *H04N 1/028* (2006.01)
  *H04N 1/50* (2006.01)

(52) U.S. Cl.
  CPC .......... *H04N 1/02805* (2013.01); *H04N 1/0288* (2013.01); *H04N 1/50* (2013.01)
  USPC ............................ 358/474; 358/475; 358/505

(58) Field of Classification Search
  CPC ......... H04N 7/18; H04N 5/232; H04N 5/225; H04N 17/00; H04N 1/04; H04N 5/262; H04N 5/374; H04N 13/02; H04N 13/04; H04N 3/12; H04N 5/235; H04N 5/238
  USPC ......... 358/474, 501, 473, 471, 505, 475, 509, 358/1.15
  See application file for complete search history.

(56) References Cited

U.S. PATENT DOCUMENTS

| | | | | |
|---|---|---|---|---|
| 4,181,851 A | * | 1/1980 | Allen et al. | 250/203.1 |
| 5,303,074 A | * | 4/1994 | Salisbury | 349/55 |
| 5,459,579 A | * | 10/1995 | Hu et al. | 358/296 |
| 5,550,938 A | * | 8/1996 | Hayakawa et al. | 382/313 |
| 5,949,057 A | * | 9/1999 | Feng | 235/472.01 |
| 6,302,545 B1 | * | 10/2001 | Schofield et al. | 359/601 |
| 7,183,148 B2 | * | 2/2007 | Yazaki et al. | 438/166 |
| 7,283,105 B2 | * | 10/2007 | Dallas et al. | 345/32 |
| 8,570,303 B2 | * | 10/2013 | Chen | 345/175 |
| 8,610,970 B1 | * | 12/2013 | Hu | 358/475 |

* cited by examiner

*Primary Examiner* — Negussie Worku
(74) *Attorney, Agent, or Firm* — Joe Zheng; Wuxi Sino IPs Ltd

(57) ABSTRACT

A computing device is equipped with a liquid crystal display (LCD) device primarily for display purpose. Techniques are described to modify such an LCD device to have the scanning capability. Without affecting the display functions of an LCD device, an image sensing module is provided behind an LCD unit in the LCD device. By controlling the liquid crystals in the LCD unit, the reflected light from an object placed against the LCD device being imaged is allowed to pass through the liquid crystals and onto an array of photosensors in the image sensing module to generate an image of the object. Thus many LCD devices can readily provide scanning functions.

12 Claims, 13 Drawing Sheets

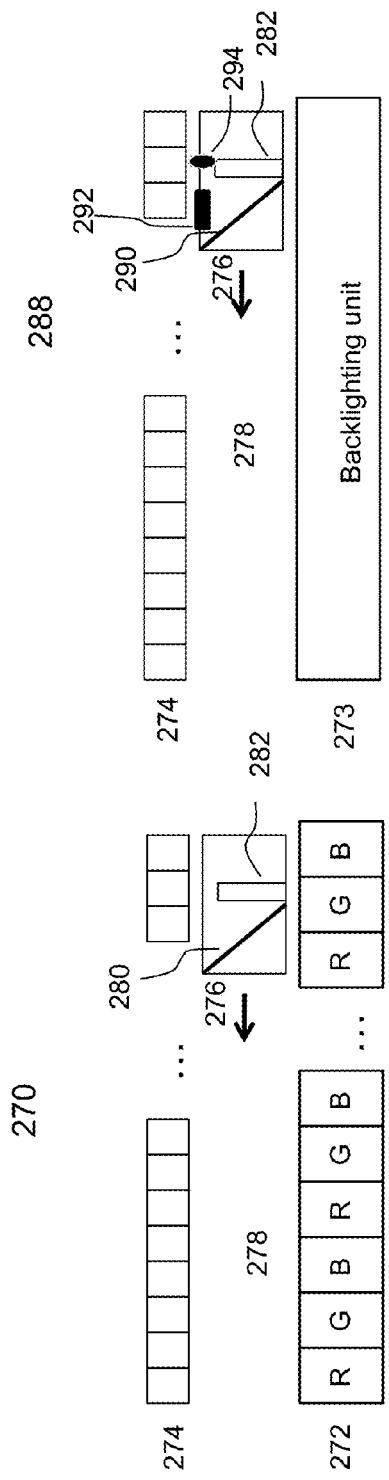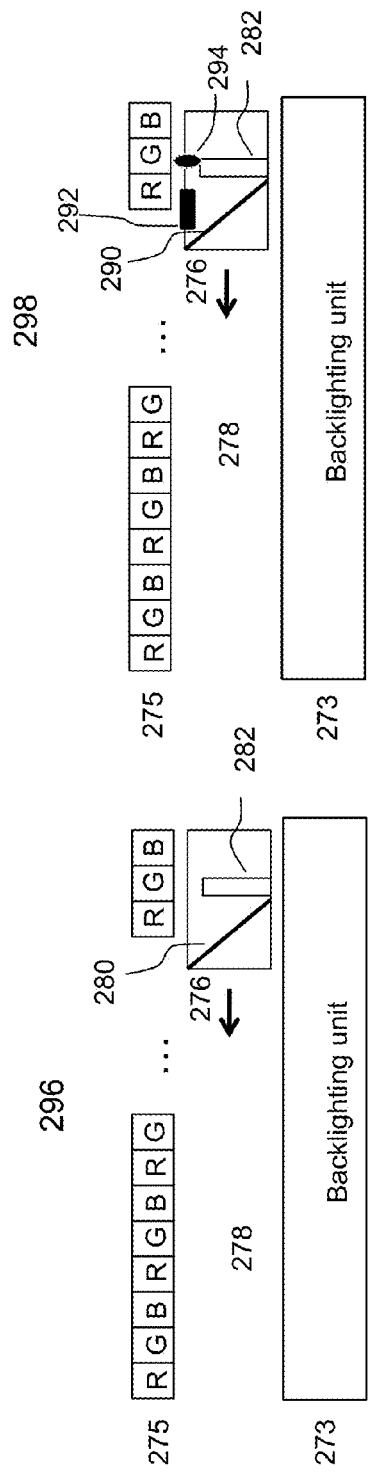

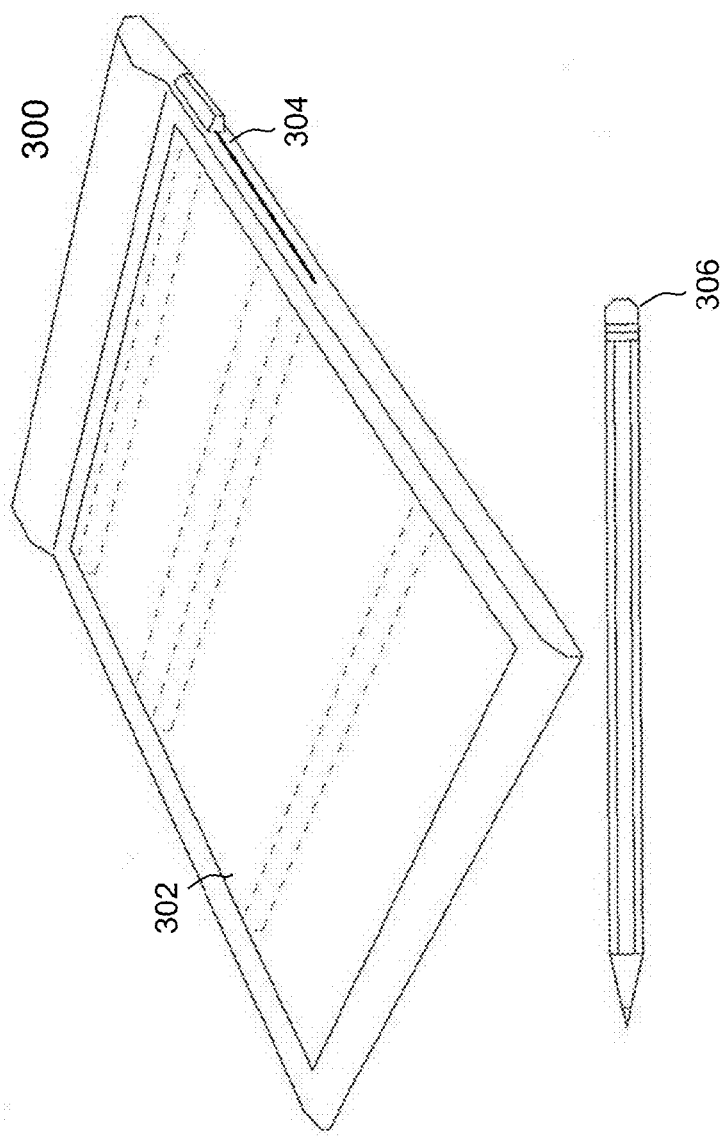

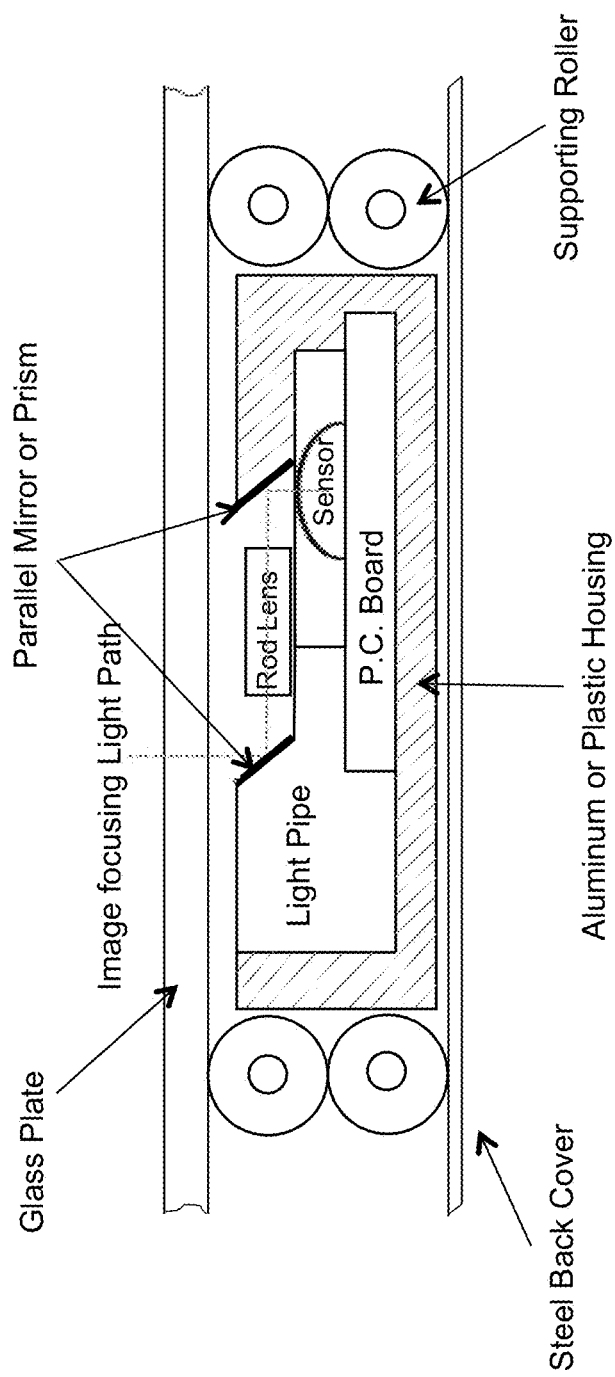
FIG. 3B.1

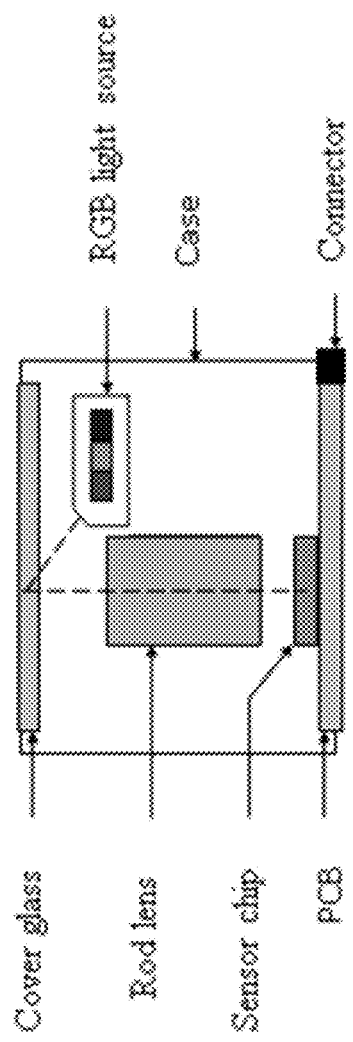
FIG. 3B.2

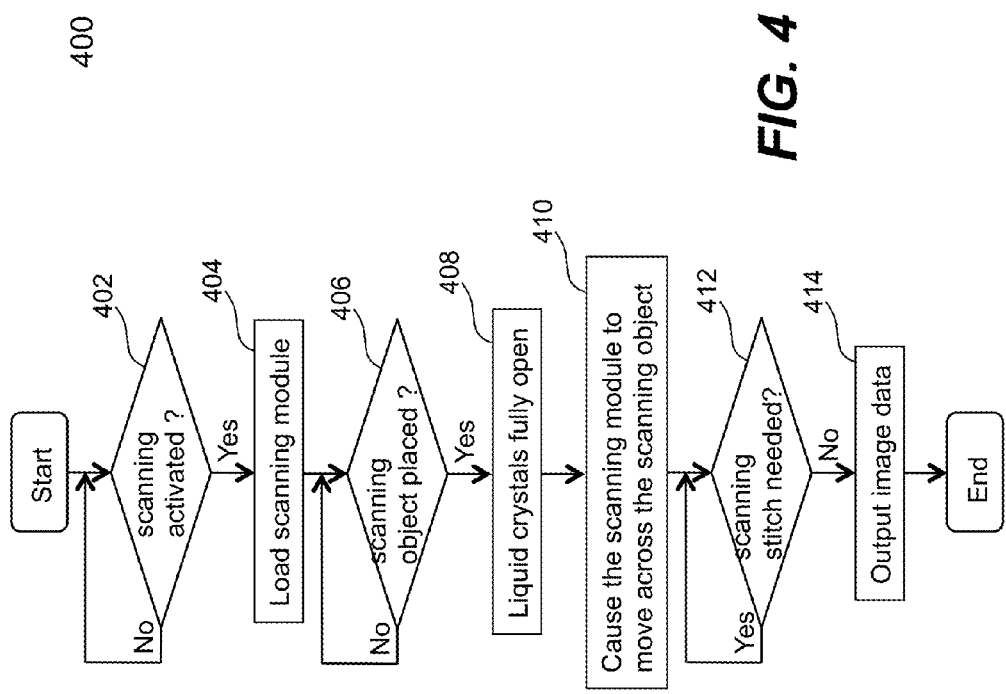

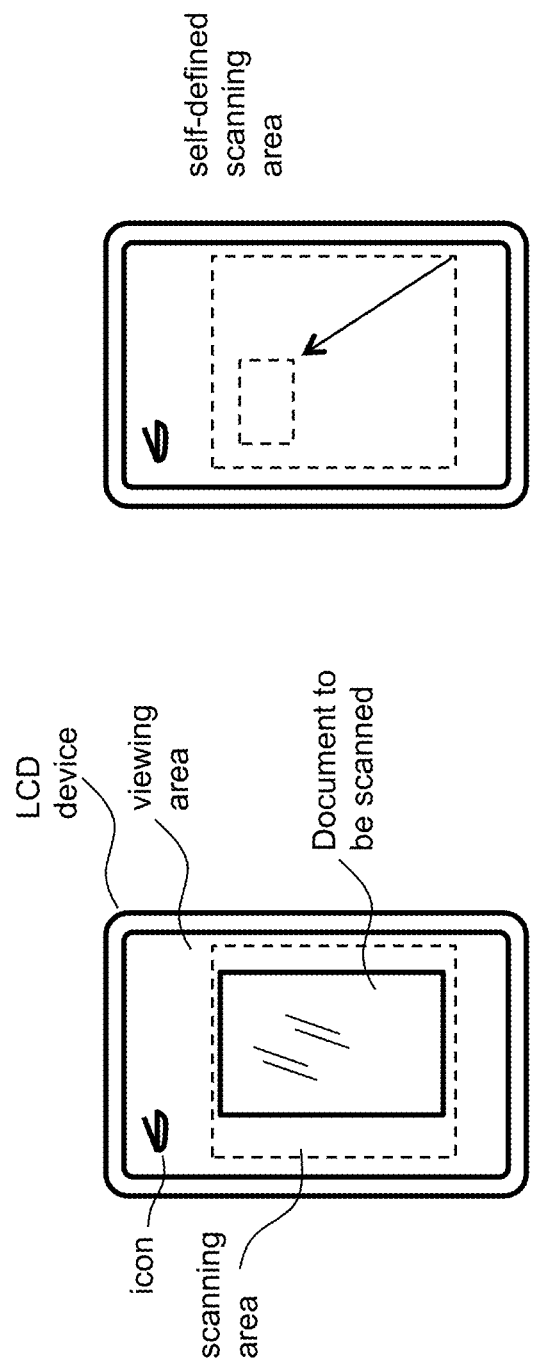

COMPUTING DEVICES USING EQUIPPED LIQUID CRYSTAL DISPLAY (LCD) FOR SCANNING

CROSS-REFERENCE TO RELATED APPLICATIONS

This application is a continuation of U.S. application Ser. No. 13/214,184, entitled "Liquid crystal display (LCD) scanners", filed on Aug. 20, 2011, now U.S. Pat. No. 8,610,970.

BACKGROUND OF THE INVENTION

1. Field of the Invention

The present invention generally relates to a portable scanning device and more particularly relates to techniques for providing scanning capability in liquid crystal displays (LCD) devices commonly seen for image or video display.

2. Description of the Related Art

There are many applications that need optical scanners to convert paper-based objects, such as texts and graphics, to an electronic format that can be subsequently analyzed, distributed and archived. One of the most popular optical scanners is a flatbed scanner that converts scanning objects, including pictures and papers, to images that can be used, for example, for designing World Wide Web pages and optical character recognition. Another popular optical scanner is what is called sheet-fed scanners that are small and unobtrusive enough to be carried around, hence referred to as mobile scanners, to provide a handy scanning means.

A mobile scanner comes handy and is often used to convert actual printed or written materials into electronic format. For example, a journalist goes far away from a news bureau to collect information about an important event there. It is considerably useful such a portable or mobile scanner can be used to scan documents on site into a computer that then forwards the electronic versions to the news bureau for immediate news reporting or archival.

Many latest mobile devices are equipped with one or more cameras. For example, iPhones from Apple Inc. are equipped with two cameras, one on the front and the other on the back to allow a user to capture video or images for various purposes. Although the image quality of such cameras is improving over the time, it is difficult to use such cameras to capture documents in good quality. Thus, various scanners are still holding their market shares and being used in applications they have been designed for.

Most current scanners in the market are standalone devices. Some advanced scanners operate on their own while others generally operate with a computer via an interface (e.g., USB). Regardless how a scanner operates, the scanning results are typically stored in a computing or storage device.

On a separate note, flat panel displays or liquid crystal displays (LCD) are possibly the most popular display devices in use today. The decreased weight and size of a flat panel display greatly increases its versatility over a cathode ray tube (CRT) display. They are used in a wide range of applications, including computer monitors, television, instrument panels, aircraft cockpit displays, signage, and etc. They are common in consumer devices such as video players, gaming devices, clocks, watches, calculators, and telephones. LCDs have displaced cathode ray tube (CRT) displays in most applications. They are usually more compact, lightweight, portable, less expensive, more reliable, and easier on the eyes. They are available in a wider range of screen sizes than CRT and plasma displays, and since they do not use phosphors, they cannot suffer image burn-in.

The flat panel LCD units are an excellent display choice for desktop or laptop computers and other portable electronic devices. Some of the LCD devices are equipped with a webcam to allow a user to conduct a video conference with other users online. It is well known that the webcam is not ideal for capturing images of documents. It would be a desirable feature if an LCD flat panel display is equipped with scanning capability for capturing images of documents when there is a need.

Accordingly, one aspect of the present invention is to make it possible that an LCD flat panel display can also provide a scanning function, thus allowing a user to scan a document without using a separate scanner.

SUMMARY OF THE INVENTION

This section is for the purpose of summarizing some aspects of the present invention and to briefly introduce some preferred embodiments. Simplifications or omissions in this section as well as in the abstract and the title may be made to avoid obscuring the purpose of this section, the abstract and the title. Such simplifications or omissions are not intended to limit the scope of the present invention.

The present invention is generally related to scanners built in LCD devices, hence LCD scanners. Without affecting the display functions of an LCD device, an image sensing module is provided behind an LCD unit in the LCD device. By controlling the liquid crystals in the LCD unit, the reflected light from an object placed against the LCD device to be imaged is allowed to pass through and onto an image sensor in the image sensing module to generate an image of the object. Depending on implementation, the image sensor may be an area sensor or a linear sensor. In the case of using the linear sensor, there is a motion mechanism that is caused to move the image sensing module across a predefined scanning area to produce scanning data of the object. Once the image is produced, various applications of the image may be provided, including display, optical character recognition and transmission to another device over a link (e.g., Bluetooth or RF) or network (e.g., wireless or landline Internet).

The present invention may be implemented as an apparatus or a part of system. According to one embodiment, the present invention is a liquid crystal display (LCD) device comprising an image sensing module disposed in the liquid crystal display (LCD) device including a front side from which an image is viewed, wherein the image sensing module including an image sensor is caused to generate an image of an object being placed directly onto the front side. The LCD device further comprises a motion mechanism to cause the image sensing module to go across a predefined area of the front side to scan the object, wherein the image sensing module generates scanning data of the object.

According to another embodiment of the present invention, the present invention is a liquid crystal display (LCD) device comprising an LCD unit including a layer of liquid crystals, an image sensing module disposed behind the layer of liquid crystals; and a control module configured to cause the liquid crystals to be fully open to allow reflected lighting from an object placed against the LCD device to reach an image sensor in the image sensing module.

One of the features, benefits and advantages in the present invention is to provide scanning functions in an LCD device.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

FIG. 2D, FIG. 2E, FIG. 2F and FIG. 2G show respectively four exemplary embodiments to illustrate how an image sensing module may be used in different configurations in an LCD device;

FIG. 3A shows an example of a computing device equipped with scanning capability;

FIG. 3B.2 shows a cross-section view of a scanning module that may be used in one of the embodiments in the current invention;

FIG. 4 shows a flowchart or process for an LCD scanner to scan a scanning object (e.g., a document) according to one embodiment of the present invention;

FIG. 5A shows a predefined scanning area on an LCD device that is smaller than the viewing area;

FIG. 5B shows another embodiment in which a user is allowed to define a scanning area;

DETAILED DESCRIPTION OF THE PREFERRED EMBODIMENTS

The detailed description of the invention is presented largely in terms of procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Figure 1:
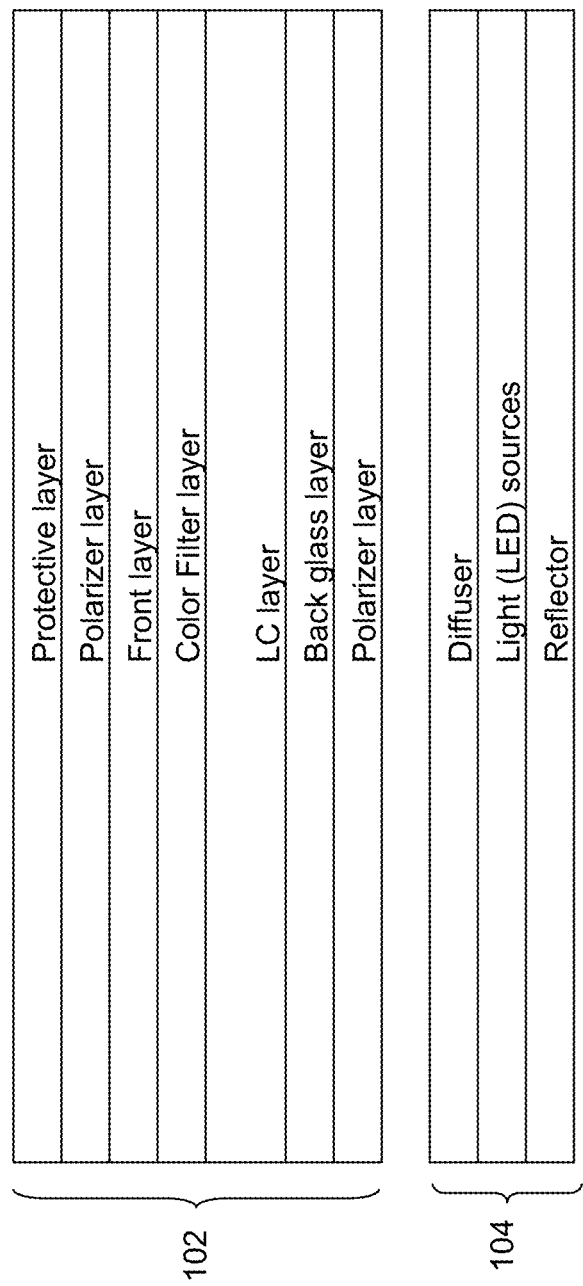
FIG. 1 shows a cross sectional view of an LCD device that may be used in one embodiment of the present invention.

Referring now to the drawings, in which like numerals refer to like parts throughout the several views. FIG. 1 shows a cross-sectional view of an LCD device 100 that may be used to employ an embodiment of the present invention. The LCD device 100 includes an LCD panel 102 and a backlighting section 104. As used herein, an LCD device is a display device that may be a standalone display often connected to a host (e.g., a desktop computer) or part of a computing device (e.g., iPad from Apple Inc.) while an LCD panel or unit means a component in the LCD device to facilitate the display through the liquid crystals therein.

The LCD panel 102 is made of several layers to produce an image illuminated by the backlighting section 104. In one perspective, the LCD panel 102 includes a layer of liquid crystals that acts as a plurality of light switches between polarizing filters. Light coming from the backlighting section 104 is blocked, partially or completely transmitted through depending on an image being displayed. In other words, when the liquid crystals are all fully opened, a full amount of the light from the backlighting section 104 goes through the LCD panel 102, leaving an impression of a white image, where it is assumed that the backlighting section 104 produces a white backlighting. Likewise, when the liquid crystals are fully closed, the light coming from the backlighting section 104 is completely blocked, leaving an impression of a black image. Thus a displayed image on an LCD device is viewed when the liquid crystals are selectively and respectively controlled to allow none, some or all of the backlighting to pass through (namely opened at varying degrees).

Figure 2A:
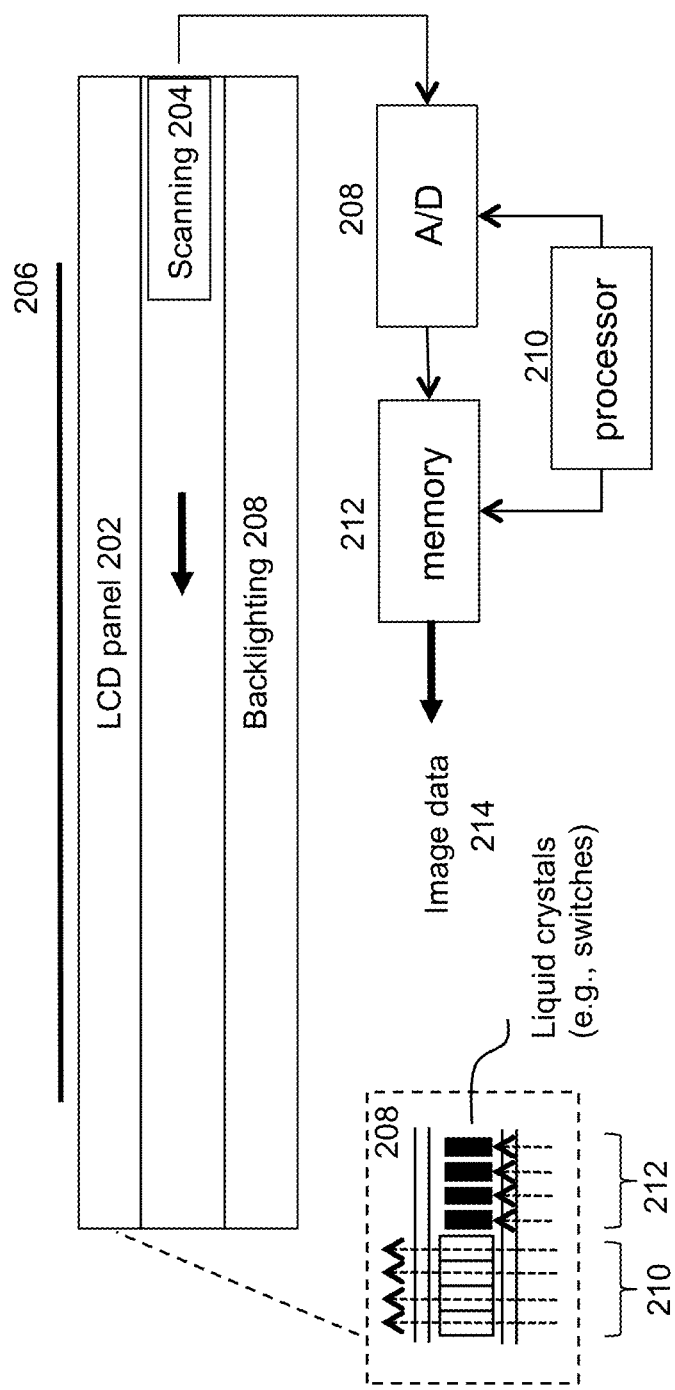
FIG. 2A shows an exemplary LCD display modified to provide scanning function according to one embodiment of the present invention, hence LCD scanner herein.

FIG. 2A shows an exemplary LCD display 200 designed to provide scanning function according to one embodiment of the present invention, hence LCD scanner herein. In one embodiment, the LCD scanner 200 includes most of things a normal LCD device has but can be used to scan a document (e.g., a receipt and a printed article). As shown in FIG. 2A, between an LCD panel 202 and the backlighting unit 208, there is a space 204 in which a scanning mechanism 204 is provided to take a photo of an object 206 placed against the front side of the LCD panel 202, where the front side is where a viewer looks for an image being displayed on an LCD device. As will be further described below, the scanning mechanism 204 includes at least an image sensor (e.g., CMOS or CCD photo sensor). Depending on implementation, the image sensor may be an area sensor or a linear sensor. Those skilled in the art shall understand the necessary optical configuration for an area image sensor to take a snapshot of the object being placed against the LCD device. Without loss of generality, the following description is based on a scanning mechanism that includes a linear image sensor. Thus the scanning mechanism will be moved across at least some of the LCD device to scan some or all of a scanning object being placed against the LCD device.

For illustration purpose, FIG. 2A also shows an exploded view 208 of the liquid crystals acting as "light switches". When the light switches 210 are turned on, namely the liquid crystals are twisted to open a pathway, light from the backlighting unit 208 transmits through these switches 210 and can be seen by a viewer. When the light switches 211 are turned off, namely the liquid crystals are twisted to close a pathway, light from the backlighting unit 208 is blocked and cannot be seen by a viewer. By the same principle, the scanning object 206 can be seen by the scanning mechanism 204 when the layer of the liquid crystals or the liquid crystals are controlled to fully open.

Figure 2B:
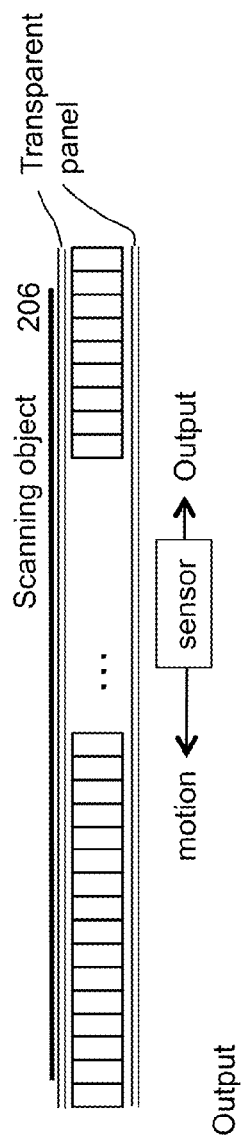
FIG. 2B shows how a scanning object is being sensed by a scanning mechanism, where the scanning mechanism includes an image sensor.

According to one embodiment, FIG. 2B shows how the scanning object 206 is being sensed by the scanning mechanism 204 with a sensor. The liquid crystals are protected by at least two transparent panels and controlled externally by a control board (not shown), where the control board is designed to control how the liquid crystals to react to an image to be displayed therethrough. In the event that the scanning function is activated (e.g., via a program and a activation), the control board causes some or all the liquid crystals to fully open, thus allowing the reflection of the scanning object 206 to transmit through and onto the scanning mechanism 204 in motion from one side to another. In one embodiment, the pathway formed by each of the liquid crystals acts as a rod lens to collect or focus a certain amount of the reflection from the scanning object 206 onto the sensor in the scanning mechanism 204. The linear sensor (e.g., an elongated sensor) in the scanning mechanism 204 thus generates a sensing signal 207.

Referring back to FIG. 2A, the sensing signal 207 is coupled to a circuit (e.g., ADC) 208 for digitization. The digitized signal is coupled to a memory space 212 (e.g., RAM) for readout as image data 214 to an application (e.g., display, transmission to another computer or optical character recognition).

Figure 2C:
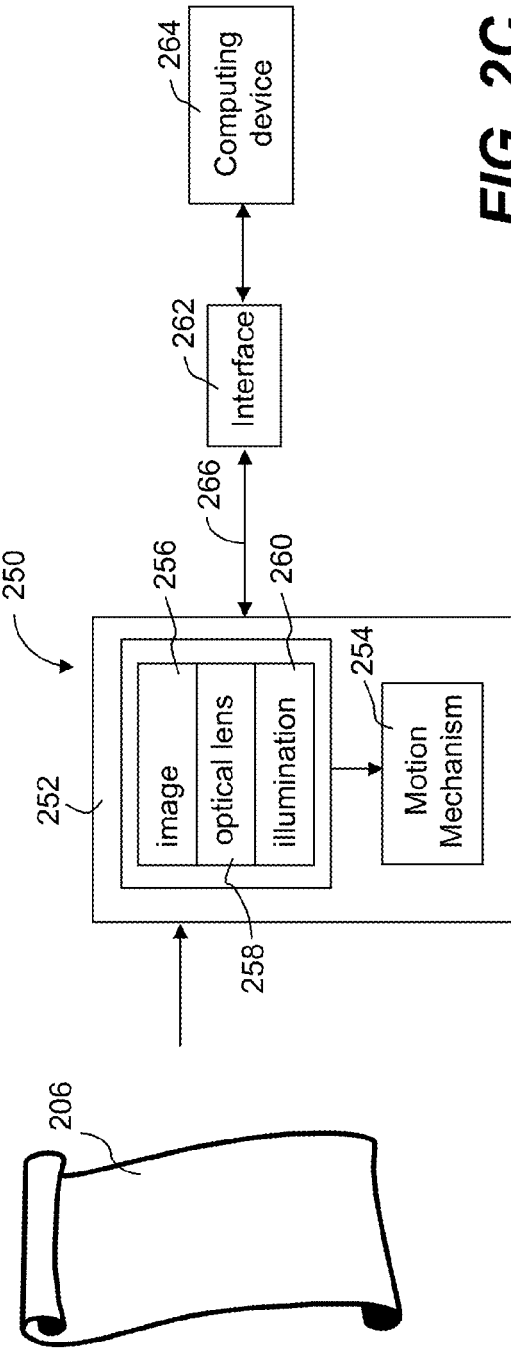
FIG. 2C shows a block diagram for a LCD scanner according to one embodiment of the present invention.

Referring now to FIG. 2C, there is shown a block diagram for a LCD scanner 250 according to one embodiment of the present invention. The LCD scanner 250 that may be integrated into an LCD device. The LCD scanner 250 comprises two parts that are an image sensing module 252 and a motion mechanism 254. In one embodiment, the image sensing module 252 may be used as the scanning mechanism 204. It should be noted that there is no separate power supply to energize the image sensing module 252 and the motion mechanism 254 to work. The power to the image sensing module 252 and the motion mechanism 254 is "borrowed" from the LCD device used to display an image (video) as well as to capture an image of a scene by way of scanning.

In one embodiment, the image sensing module 252 comprises an image sensor 256, an optical lens 258 and an illumination system 260. Preferably, the image sensor 256 is an array of Complementary Metal-Oxide Semiconductor (CMOS) photodetectors, each producing a charge signal when being exposed to an incident light. Generally, the number of photodetectors in the array depends on the maximum size of a scanning document the scanner is designed to accommodate and the resultant image resolution. For example, a regular paper has a size of 8.5×11 inches. For 300 dpi (dot per inch) resolution, the number of photodetectors is 9×300=2,700 wherein 0.5 inch is added to account for a margin of the 8.5-inch width.

The optical lens 258 collects the reflected light from a scanning object illuminated by an illumination source 260 onto the image sensor 256, thereby an image of the scanning object is produced. The motion mechanism 254 is responsible for moving the image sensing module 252 vertically or horizontally across some or all of the display area of the LCD device so that the scanning object can be scanned.

The image generated is readout via a data bus 266 to an interface 262 that is coupled to a computing device 264. The interface 262 may be of the industrial standards (e.g., PCI or USB). Depending on implementation, the computing device 264 may be a tablet computer, a laptop computer, a desktop computer or any computing device with an LCD display (e.g., iPhone or iPad).

According to one embodiment, FIG. 2D shows an illustration 270 of using the backlighting in the LCD device to illuminate a scanning document. It is assumed that the LCD device has a backlighting unit that is based on LEDs in three primary color groups (e.g., Red, Green and Blue). The detailed operations of the backlighting unit are described in U.S. Pat. No. 7,324,080 which is hereby incorporated by reference. The LEDs in color groups are sequentially turned on for each frame of image to be displayed on the LCD device.

When a document is to be scanned in color by the LCD device, the colored illumination from the backlighting unit 272 is used to illuminate the document through the opened liquid crystals 274. In operation, an image sensing module 276 is caused to move along a space 278 provided between the backlighting unit 272 and the liquid crystals 274 (other layers are omitted for illustration purpose). The image sensing module 276 comprises a lens or an optical part 280 and an image sensor 282. The optical part 280 is designed to capture the reflected light from the document and directs or focuses it onto the sensor 282.

In one embodiment, for a line of scanning, the LEDs in color groups are sequentially turned on, resulting in three signals from the sensor 282, each for one of the colored lighting. Upon finishing going across the document, the sensor 282 has produced three sets of scanning signals. Once these scanning signals are properly combined, a colored scanned image is produced.

FIG. 2E shows another embodiment in which an image sensing module 290 is designed to provide its own light source, in which case, illumination from the backlighting unit 272 does not matter to the scanning. The image sensing module 290 comprises an optical part (e.g., a mirror or a filter) 292, a lens 294 and a light source 282. Depending on whether to generate a black-and-white image or a color image, the light source 282 may be a white light source or a colored light source. For example, in the application of scanning business cards for optical character recognition, a black-and-white scanning would be sufficient. Nevertheless, those skilled in the art would understand even a colored light source can be configured to produce a white lighting.

In operation, a document being scanned is illuminated by the light source 294. The reflected light from the document being scanned is transmitted through the liquid crystals (fully opened) and directed or focused by the lens 294 onto the image sensor 282. In one embodiment, the light source 282 includes at least three colored lights (e.g., LEDs in red, green and blue). For every scanning, the three colored lights are sequentially turned on, resulting in three signals from the sensor 282, each for one of the colored lights. Upon finishing going across the document, the sensor 282 has produced three sets of scanning signals. Once these scanning signals are properly combined, a colored scanned image is produced.

FIG. 2F shows an LCD device that uses color filters in conjunction with the liquid crystals with a white backlighting to show color images/videos. The color filters (e.g., in red, green and blue) are provided to convert the white backlighting to corresponding red, green and blue lights for each pixel, resulting a color presentation on the LCD device. In a similar fashion, the white backlighting illuminates a document being scanned via the corresponding color filters, where the image sensor 282 is exposed to colored lights and generate three scanning signals or data. Once these scanning signals or data are properly combined, a colored scanned image is produced.

FIG. 2G shows a similar LCD device that uses color filters in conjunction with the liquid crystals but with a white backlighting to show color images/videos. Instead of using the backlighting unit 273 to illuminate a document being scanned, the light 294 in the image sensing module 276 is provided to illuminate the document via the color filters. The corresponding liquid crystals to the color filters are controlled to turn on sequentially for the image sensing module 276 to capture corresponding colored reflected lights to generate three scanning signals or data. Once these scanning signals or data are properly combined, a colored scanned image is produced.

FIG. 2D, FIG. 2E, FIG. 2F and FIG. 2G show respectively four exemplary embodiments to illustrate how an image sensing module may be used in different configurations in an LCD device. Given the descriptions herein, those skilled in the art may appreciate other combinations among different configurations in an LCD device and an image sensing module are possible and within the disclosure of the present invention.

FIG. 3A shows an example of a computing device 300 equipped with scanning capability. The computing device 300 includes an LCD display 302. Under the LCD display 302, there is a scanning module corresponding to the motion mechanism 254 of FIG. 2A. The scanning function of the computing device 300 is activated by a program installed therein. Depending on implementation, the scanning module behind the LCD display 302 may be automatically driven or manually moved to go across a partial or the entire area of the LCD display 302. In one embodiment, the program is activated, for example, by a stylus or a touch on the LCD display 302, to activate the scanning capability.

Figure 3B:
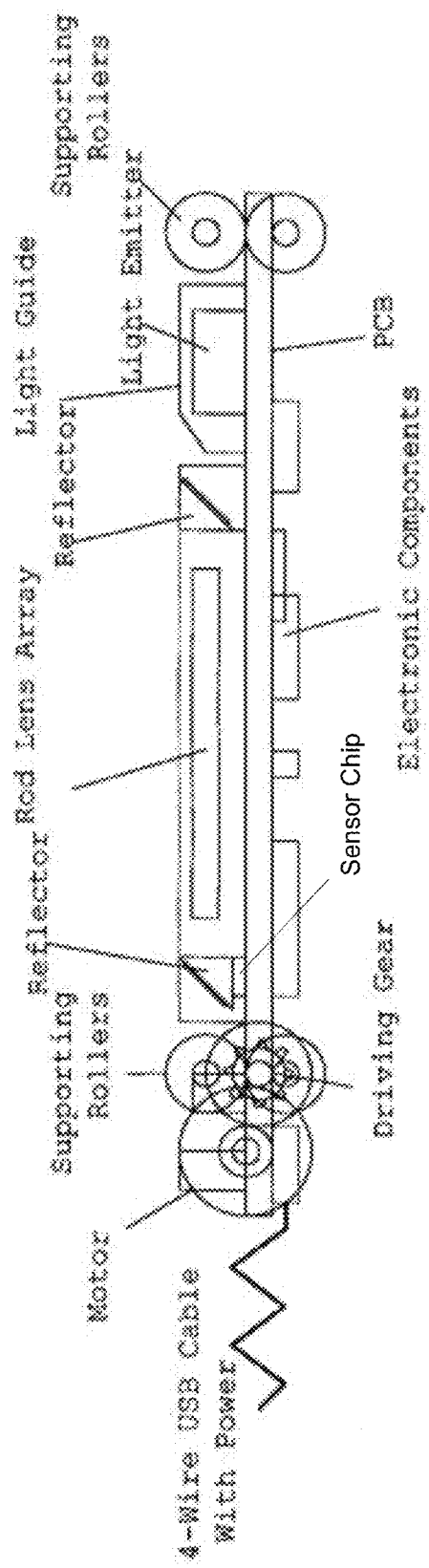
FIG. 3B.1 shows a cross-section view of a LCD display including a scanning module with a set of rollers driven by a motor behind or within an LCD unit.
Figure 3C:
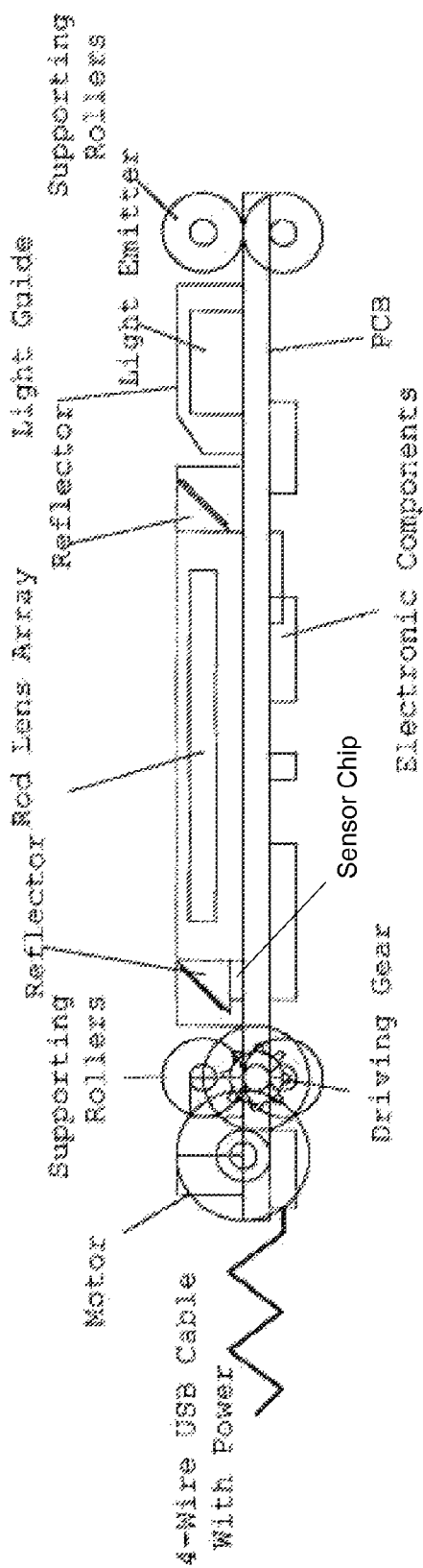
FIG. 3C shows a design to illustrate how a scanning module moves behind or within an LCD unit.

FIG. 3B.11 shows a cross-section view of a LCD display including a scanning module with a set of rollers driven by a motor behind or within an LCD unit. FIG. 3B.2 shows a cross-section view of a scanning module that may be used in one of the embodiments in the current invention. FIG. 3C shows a design to illustrate how a scanning module moves behind or within an LCD display. The scanning module as illustrated includes a reflector to reflect the reflection from the scanning object being illuminated by one or more LEDs onto an image sensor. The use of one or more reflector is to make the scanning module as low profile as possible so that the thickness of an LCD device would not be affected too much, especially in the case of portable devices. In any case, it should be noted the illumination and capturing of the reflection of the scanning object are possible only when the liquid crystals are fully or substantially opened to allow light to go through.

FIG. 4 shows a flowchart or process 400 for an LCD scanner to scan a scanning object (e.g., a document) according to one embodiment of the present invention. The process 400 may be implemented in a computing device with an LCD or in a LCD device itself. According to one embodiment, the process 400 may be further understood in conjunction with FIG. 2A-FIG. 2C.

At 402, the process 400 determines if the scanning function of an LCD device is activated. Depending on implementation, the scanning function of an LCD device is activated via a button accessible on the LCD device or via a program. For example, a user needs to scan a receipt, an application or a step in a program preinstalled in a computing device is activated to start the scanning process. At 404, a processor in the LCD device or a computing device to which the LCD device is coupled thereto is configured to instruct a user to place the scanning object (i.e., a receipt or a document) onto or against the LCD device. A technique may be provided to detect if such an object has been placed against the LCD device or not.

It is assumed at 406 that a document has been placed against a front side of the LCD device. At 408, a module in the LCD device or in the computing device is configured to turn on all the liquid crystals in a liquid crystal layer in the LCD device. The "opened" liquid crystals allow the reflected light from the object to pass through the liquid crystal layer and to an image sensor in the image sensing module.

In one embodiment, the image sensing module includes an area sensor that can capture an image of the object in one snapshot. In another embodiment, the image sensing module includes a linear image sensor that must be moved by a motion mechanism (e.g., rollers and/or motors). As shown in FIG. 4, as an example, the image sensing mechanism is caused to move across a predefined area of the LCD device at 410 to scan some or all of the object.

Although it is possible to have the entire viewing area of the LCD device to be a scanning area, some manufacturers may preferably define a specific area for scanning (e.g., smaller than the viewing area). FIG. 5A shows a predefined scanning area on an LCD device that is smaller than the viewing area. One advantage for this feature is to allow a user to activate other application before or after an object is placed against the display area. As shown in FIG. 5A, a scanning icon may be activated to take a snapshot of the scanning object or start the scanning after a user places the object onto the display screen.

FIG. 5B shows another embodiment in which a user is allowed to define a scanning area. For example, when the LCD device (e.g., iPad) is used to scan a business card, the viewing area is much bigger than the size of a business card. To avoid generating a lot of useless data surrounding a business card being scanned, in one embodiment, a (software) module is provided to allow a user to self-define a scanning area in which case only corresponding liquid crystals in a liquid crystal layer of the LCD device are controlled to allow the reflected light from the business card being illuminated to pass through, the ambient light would be blocked by other liquid crystals in the liquid crystal layer of the LCD device. With corresponding designs to control the image sensing module, an image covering substantially the business card is generated.

It should be noted that there are a few places herein appearing "a document is or is being illuminated" or the like does not necessarily mean that the document being placed against the LCD device is illuminated in its entirety at the same time. In some embodiments, only or around the area of the document being scanned by the underlying image sensing module is illuminated. As a result, a user may see a moving elongated illuminating line appears on the LCD device, and within a scanning area.

Figure 5C:
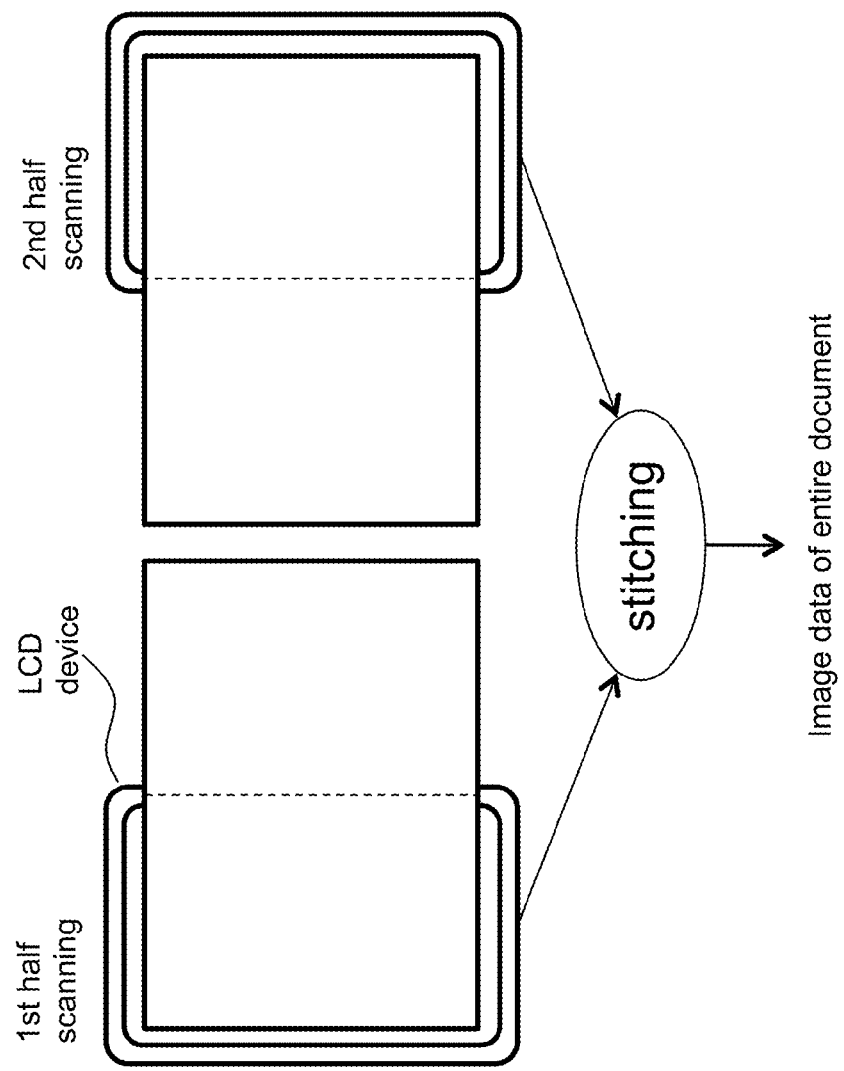
FIG. 5C shows that a computing device (e.g., iPad) has a viewing area not sufficiently large enough to accommodate a piece of letter-sized paper, thus a user needs to scan a document twice to produce an entire image of the paper.

In some cases, a computing device (e.g., iPad) has a viewing area not sufficiently large enough to accommodate a piece of letter-sized paper, a user may be instructed to scan a document twice as shown in FIG. 5C, where a tablet computer has a viewing area that is about a half of a document to be scanned. Thus a user will be asked to scan a first half of the document then the second half of the document at 412. Operationally, the computing device is equipped with a stitching module configured to stitch or combine two scanning data together to produce an entire image of the document at 412.

Referring back to FIG. 4. At 414, the image is read out, typically from RAM (corresponding to the memory 212 of FIG. 2A). The image is then provided to an application (e.g., display, optical character recognition or transmission to another computing device).

Figure 6:
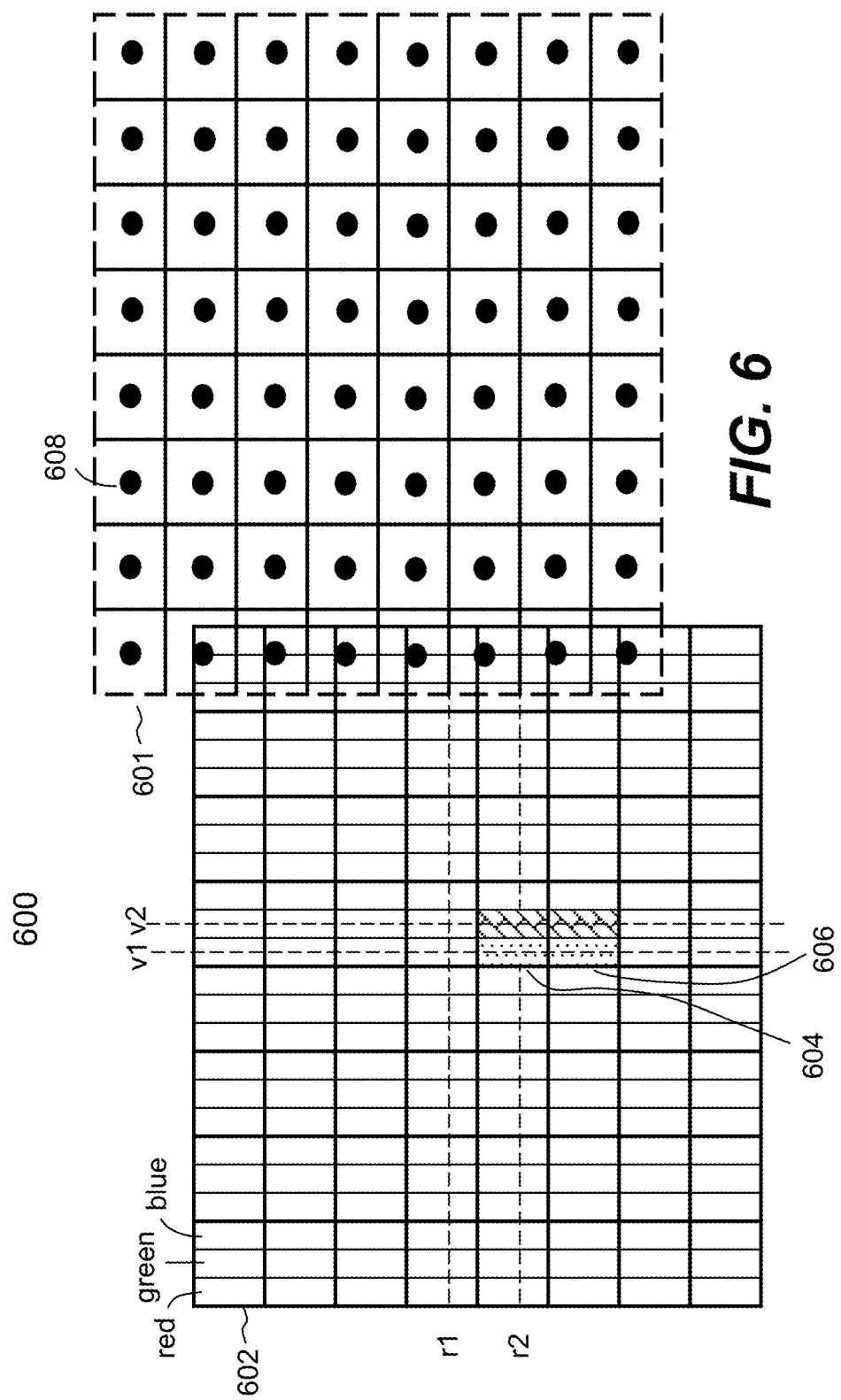
FIG. 6 shows another embodiment of using an array of photosensors on a transparent sheet (e.g., a thin film or glass sheet).

FIG. 6 shows another embodiment of using an array of photosensors on a transparent sheet 601 (e.g., a thin film or glass sheet). An LCD unit 600 is presented to include three colored filters (e.g., red, green and blue) as a single (display) pixel. Each of the pixels, such as a pixel 602, has three subpixels labeled respectively red, green and blue. Through the careful control and variation of the voltage applied while each subpixel can reach 256 levels of brightness (shades) per pixel. Combining the subpixels produces a possible palette of 16.8 million colors (e.g., 256 shades of red×256 shades of green×256 shades of blue). For example, when two subpixels in pixels 604 and 605 are applied with control signals via column and row lines, the backlighting passes through the red and green subpixels, causing a mixed impression of "yellow". In extreme cases, when all subpixels in a pixel are turned on or off, a white or black color is created or perceived. In applications of showing an image or video on an LCD, control signals in accordance with an image or video are applied to the pixels, respectively, causing the subpixels in each of the pixels respectively on or off. As a result, the image or video is displayed on the LCD.

The transparent sheet 601 is disposed behind the array of colored filters and corresponding liquid crystals (shown as shifted for illustration). In one embodiment, one or more photosensors 608 are provided for each of the pixels to sense the colored lights respectively from the corresponding pixel. In one embodiment, each of the photosensors 608 is provided with a lens to facilitate the focusing of a corresponding light onto the photosensor. Instead of going across the document, the photosensors 608 take snapshots to produce three sets of image signals. A circuit module, coupled to the photosensors, is provided to read out image signals from the photosensors. The detail of the circuit module is not further described as those skilled in the art shall know the design given the description herein. Once the three images are properly combined, a colored snapshot image is produced.

According to one application, two users are video-chatting or video conferencing over the Internet. When a document needs to be shared, one embodiment of the present invention can be used and deliver unexpected results. Although each of the computers the users are using is equipped with a webcam, the image quality of a document by a webcam is generally not good for reading. According, the display screen on each of the computers is designed to include the scanning capability as described herein. As a result, the user does not have to hold a piece of paper in front of a webcam to share with the other user. Instead, the user can hold the paper against the display screen without blocking the webcam in use and activate the scanning function to scan the document. Once the image of the document is generated, the image can be immediately sent over to the other user for sharing.

The present invention has been described in sufficient detail with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the forgoing description of embodiments.

I claim:

1. A computing device comprising:
a liquid crystal display (LCD) device, having an array of pixels, provided to display a video or an image from the computing device, the LCD device further comprising:
an LCD unit including an array of liquid crystals, each of the pixels in the LCD device corresponding to one or more of the liquid crystals;
an array of photosensors disposed behind the array of liquid crystals, each of the photosensors corresponding to one or more of the liquid crystals that are configured to open substantially to allow a reflected light to pass through onto some or all of the photosensors, wherein the reflected light is from a scanning object being placed against the LCD device; and
a circuit module, coupled to the photosensors, reading out sensing signals from the photosensors to produce an image of the scanning object.

2. The computing device as recited in claim 1, wherein an area of the array of photosensors is smaller than a display area of the LCD device, and provided behind the LCD unit to scan the scanning object placed right onto a specific area on a display side of the LCD device.

3. The computing device as recited in claim 2, wherein each of the photosensors is provided with a lens to facilitate the reflected light to be focused onto the each of the photosensors.

4. The computing device as recited in claim 1, further comprising a control module configured to operate independently from the video or image being displayed.

5. The computing device as recited in claim 4, wherein the control module is designed to control some of all of the liquid crystals in the LCD unit to fully transmit the reflected light through.

6. The computing device as recited in claim 1, wherein the LCD unit includes a backlighting unit, lighting from the backlighting unit passes through the liquid crystals and is modulated by the liquid crystals in accordance with the image or video to be displayed on the LCD device.

7. The computing device as recited in claim 6, wherein the backlighting unit produces three colored illuminations, the photosensors are controlled to produce three corresponding images for each scanning of the scanning object.

8. The computing device as recited in claim 7, wherein the images are combined in the LCD device.

9. The computing device as recited in claim 7, wherein the images are combined in the computing device via a application.

10. The computing device as recited in claim 1, wherein the computing device is a portable device.

11. The computing device as recited in claim 10, further comprising a camera to image a surrounding area of the computing device.

12. The computing device as recited in claim 11, wherein the camera continues to image the surrounding area while the scanning object is being imaged.

* * * * *